United States Patent [19]

Lady, Sr. et al.

[11] 3,740,643
[45] June 19, 1973

[54] APPARATUS FOR MEASURING THE DISTANCE BETWEEN A WORKPIECE SURFACE AND A DATUM

[75] Inventors: Robert M. Lady, Sr., Cumming; William G. Steiner, Smyrna, both of Ga.

[73] Assignee: The United States of America as represented by the Secretary of the Navy, Washington, D.C.

[22] Filed: Aug. 30, 1971

[21] Appl. No.: 176,125

[52] U.S. Cl. .............................. 324/34 D, 340/282
[51] Int. Cl. ............................................. G01r 33/00
[58] Field of Search .................... 324/34 R, 34 PS, 324/34 D; 340/195, 199, 282

[56] References Cited
UNITED STATES PATENTS
3,243,992  4/1966  Woods ............................ 324/34 R

*Primary Examiner*—Robert J. Corcoran
*Attorney*—R. S. Sciascia and A. L. Branning

[57] ABSTRACT

Measuring apparatus which accurately measures the distance between a surface and an imaginary datum line or plane. One or more transducers are mounted on a carrier which is positionable adjacent a surface which is to be measured with respect to an imaginary datum. The surface being measured may be in the form of a complex shape, and the transducers need not physically contact the surface. Correction factors are provided for possible misalignment of the transducer carrier and also for the possible non-linear response of the transducer.

11 Claims, 8 Drawing Figures

INVENTOR
ROBERT M. LADY &
WILLIAM G. STEINER
BY George C. Sullivan
AGENT

APPARATUS FOR MEASURING THE DISTANCE BETWEEN A WORKPIECE SURFACE AND A DATUM

This invention relates in general to measuring apparatus and in particular to measuring apparatus for obtaining measurements of one or more locations on a surface taken with respect to an imaginary reference datum line or datum plane.

The measurement art is replete with measuring devices and systems for measuring or checking the dimensions of various types of work pieces. Such prior art measuring apparatus typically either measures a point-to-point distance on the work piece, as in the case of a micrometer, or else measures the distance from a point on the work piece to a known tangible position, as in the case of a dial indicator affixed to a measuring rest surface.

Such prior art apparatus generally does not permit readily measuring the distance from a point or locations on the work piece, for example, to an imaginary datum or reference line at some distance removed from the work piece. Thus, an internal micrometer measures the diameter of a bore through the work piece but does not measure the radial distance from the bore wall to an imaginary centerline extending through the bore. Similarly, conventional measuring devices can determine the width of a slot or keyway but do not permit direct measurement of the distance from a point on the wall of the slot outwardly to a plane disposed, for example, at the nominal midpoint between the walls of the slot.

In addition to the foregoing shortcomings of prior art measuring apparatus, there remain some types of work pieces which are virtually impossible to measure or check with a desired degree of accuracy. In the measurement of internal dimensions associated with long internal bores which also may have complex inner shapes, as in the case of a rifled gun barrel, for example, prior art techniques for measuring the distance from a rifling groove or other passageway extending radially outwardly of the nominal bore diameter have required expedients such as a cantilever arm extending along the length of the bore to bring a contact pin into engagement with the bore surface at a point to be measured. The movement of the cantilever arm at a point outside the bore then is measured in an attempt to determine the desired dimension. The use of this technique to measure internal dimensions of bores having a substantial length is difficult at best, and is virtually useless where dimensional measurements are required to the nearest 0.0001 inch with respect to a imaginary reference datum extending through the bore. Moreover, techniques such as the aforementioned cantilever measurement or other apparatus which requires direct physical contact with the surface being measured prevent the use of proximity sensing apparatus which provides a direct electrical output signal corresponding to the dimension being measured, since such prior art devices cannot accurately determine the precise position of a non-contacting proximity sensor.

Accordingly, it is an object of the present invention to provide improved measuring apparatus.

It is another object of the present invention to provide measuring apparatus which accurately measures the distance between a surface and an imaginary datum.

It is yet another object of the present invention to provide improved measuring apparatus including a measurement transducer carrier on which one or more transducers are carried for positioning adjacent a work piece and which does not require precise pre-positioning of the carrier.

Still another object of the present invention is to provide improved measuring apparatus for use with non-contact proximity transducers.

Other objects and many of the attendant advantages of the present invention will become more readily apparent from consideration of the following description and annexed drawing relating to an exemplary embodiment of the present invention, wherein FIG. 1 shows a schematic functional operating diagram of measuring circuitry according to an embodiment of the present invention;

Stated generally, the disclosed embodiment of the present invention includes a transducer carrier having one or more electromagnetic non-contact transducers mounted therein to be disposed by the carrier at one or more locations along a work piece having a surface to be dimensionally measured with respect to an imaginary datum line or datum plane. The exact location of the transducer carrier is determined by a suitable technique such as optical sighting, and the carrier position data is correlated with the measured output from the transducers to determine the exact position of a work piece location with respect to a desired datum.

Figure 1:
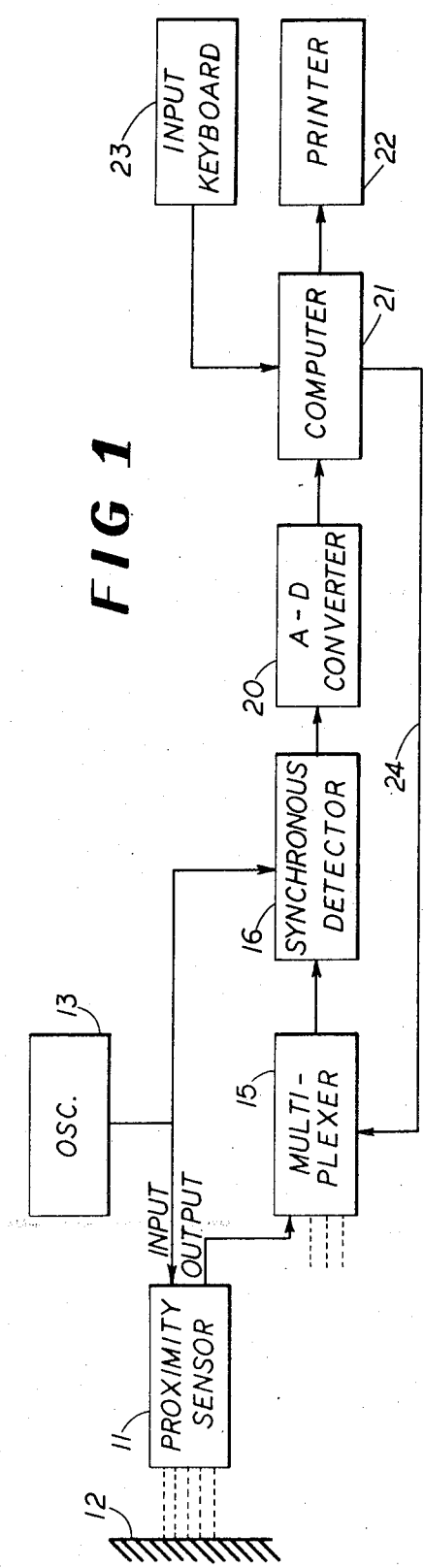
Figure 2:
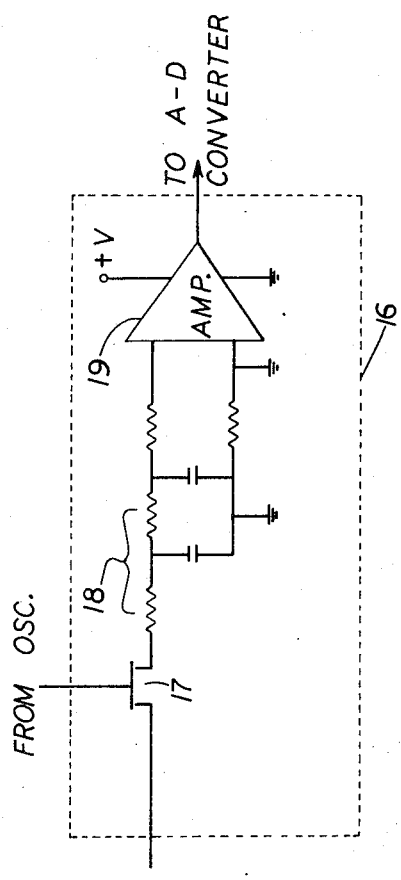
FIG. 2 shows a schematic diagram of the synchronous detector used in the FIG. 1 embodiment.

More specifically and with reference taken to FIGS. 1 and 2 of the drawing, there is shown measuring apparatus including an electromagnetic proximity sensor 11 disposed in non-contacting relationship with a surface 12 of a work piece to be measured. It will be apparent, as pointed out in greater detail below, that a number of proximity sensors 11 may be carried by a single sensor carrier. Only one such sensor is shown herein, however, to simplify the explanation of a particular aspect of the present invention. Each of the sensors 11 may, for example, advantageously be electromagnetic proximity transducers of the type having an input or primary winding connected to receive an input signal from an oscillator 13 and having a pair of secondary windings connected in series opposition, with a substantially fixed-amplitude signal being coupled into one of the secondary windings from the primary winding and with a variable-amplitude signal being coupled into the other of the secondary windings from the primary winding dependent upon the gap or displacement between the proximity sensor and the adjacent surface 12. The oscillator 13 supplies an input signal at a frequency generally determined, as is known by those skilled in the art, in view of the material of which the surface 12 is made. For example, using the proximity sensor 11 adjacent a steel surface may require an optimum oscillator frequency of about 5Khz, whereas an aluminum surface may require an optimum oscillator signal of 50Khz. Electromagnetic proximity transducers of the type described herein are obtainable from Transducer Systems, Inc., Willow Groove, Pa.

Figure 7:
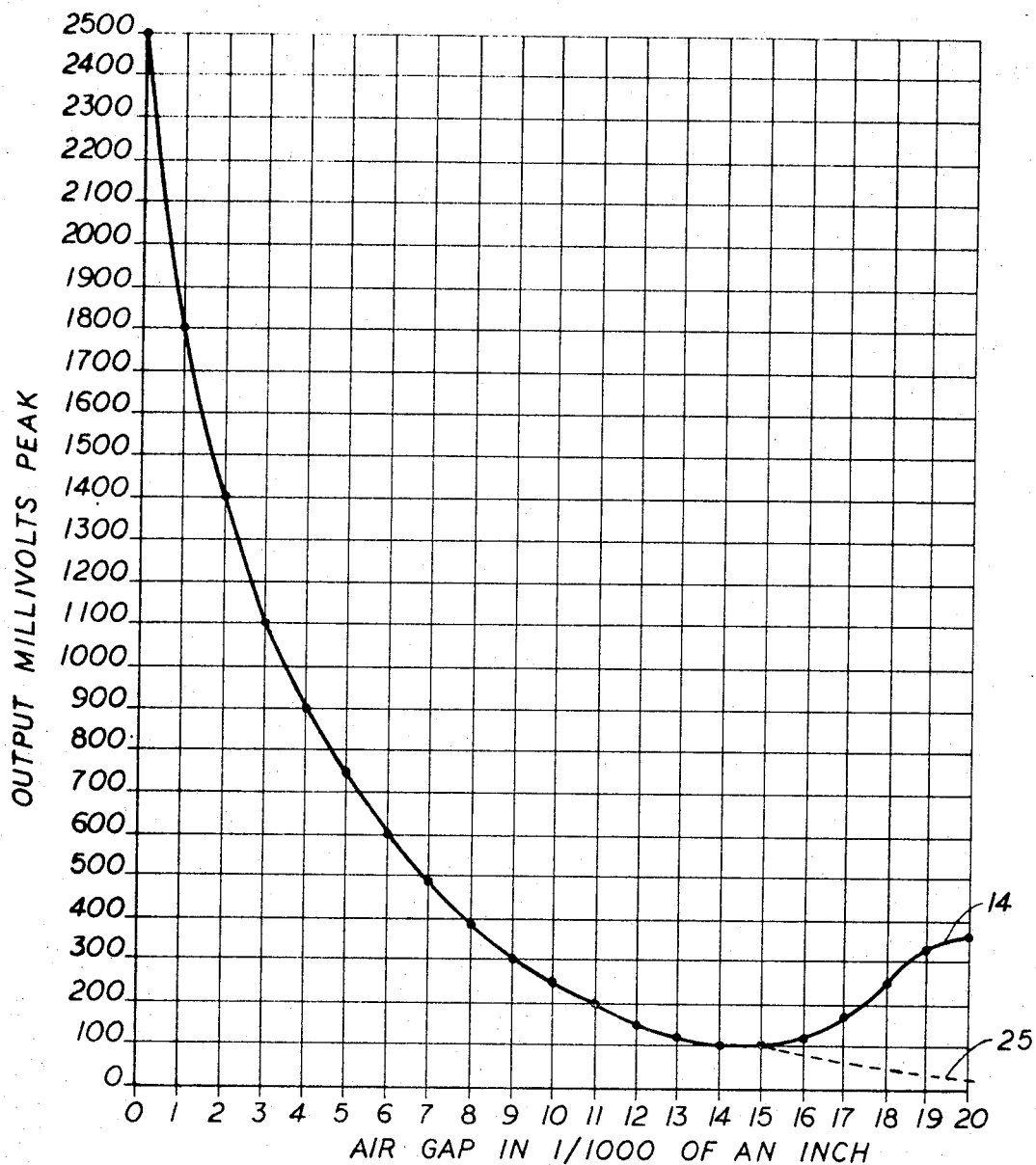
FIG. 7 shows a graphic representation of corrected transducer response according to an embodiment of the present invention.

It is typically a characteristic of such electromagnetic proximity transducers that the voltage induced in the variable-amplitude secondary coil is inversely proportional to the air gap between the transducer 11 and the surface 12, this relationship being depicted graphically in FIG. 7. It can be seen from FIG. 7, however, that after the air gap increases beyond a certain amount the output voltage actually commences to increase, thereby producing an ambiguous situation in which a measured output voltage can denote either of two possible air gaps. This unwanted phenomenom results from a shifting of phase of the signal induced in the variable amplitude secondary winding with respect to the phase of the relatively fixed bucking signal coupled into the other secondary winding; even though the signal coupled through the air gap into the variable-amplitude winding is less for a greater air gap, this reduced amplitude signal is phase-shifted so that the bucking relationship formerly existing between the two secondary windings no longer exists, or at least exists to a lesser extent, thus causing the amplitude of the output voltage from the transducer 11 to increase spuriously as shown at the region 14 of FIG. 7.

This unwanted ambiguity in the output of the electromagnetic transducer 11 is corrected according to the present invention by passing the output of a particular transducer as selected in the multiplexer 15 through a synchronous detector 16. The synchronous detector 16, as shown in greater detail in FIG. 2, includes a suitable signal gate such as a field effect transistor 17 connected (in the disclosed embodiment) to permit the selected proximity transducer output signal to pass through the signal gate only during the coincidence of a positive signal from the transducer and a gating signal provided by the positive portion of the output from the oscillator. Operation of the gate is evident from FIG. 3, wherein the multiplexer output corresponding to a selected transducer 11 is shown having an amount of phase shift, relative to the oscillator output, which is determined by the air gap between the transducer and the surface being measured. Only that portion of the multiplexer output which coincides in phase with the positive portion on the oscillator output signal will be permitted to pass through the gate transistor 17, such portion being shown by shading in FIG. 3. Thus, the spurious or phase-shift portion of the transducer output signal is eliminated by the synchronous detector.

The output from the signal gate passes through a low-pass filter 18 and is supplied to the amplifier 19 to be amplified, and then passes to an analog-digital converter 20, referring again to FIG. 1. The output of the analog-digital converter 20 is supplied to a digital computer indicated generally at 21 which is programmed by known programming techniques to accomplish computations as disclosed below. The output of the computer is available at a suitable terminal such as a printer 22, and an input keyboard 23 is provided for inputting certain externally measured data to the computer also as described below. In the case of a measuring system utilizing a number of transducers 11, the computer can be programmed as desired to accomplish one-by-one sequential selection of the particular transducer whose signal is to be observed, this selection being denoted in FIG. 1 through the control line 24 extending from the computer 21 to the mutliplexer 15.

Figure 3:
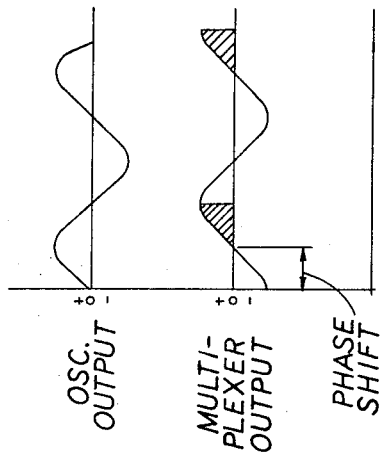
FIG. 3 shows wave forms describing the operation of the synchronous detector of FIG. 2.

It can be seen from FIG. 3 that the gated portion of the proximity transducer signal which is actually passed through the low-pass filter and amplified is reduced in DC amplitude as the phase difference between such signal and the oscillator output is increased. The resultant output signal from the signal gate 17, as smoothed by the low-pass filter 18, causes the effective overall response curve of the transducer at large air gaps to assume the curve shown at 25 in FIG. 7, wherein the region 14 of ambiguity has been eliminated and a more nearly linear response of the transducer is achieved.

Figure 4:
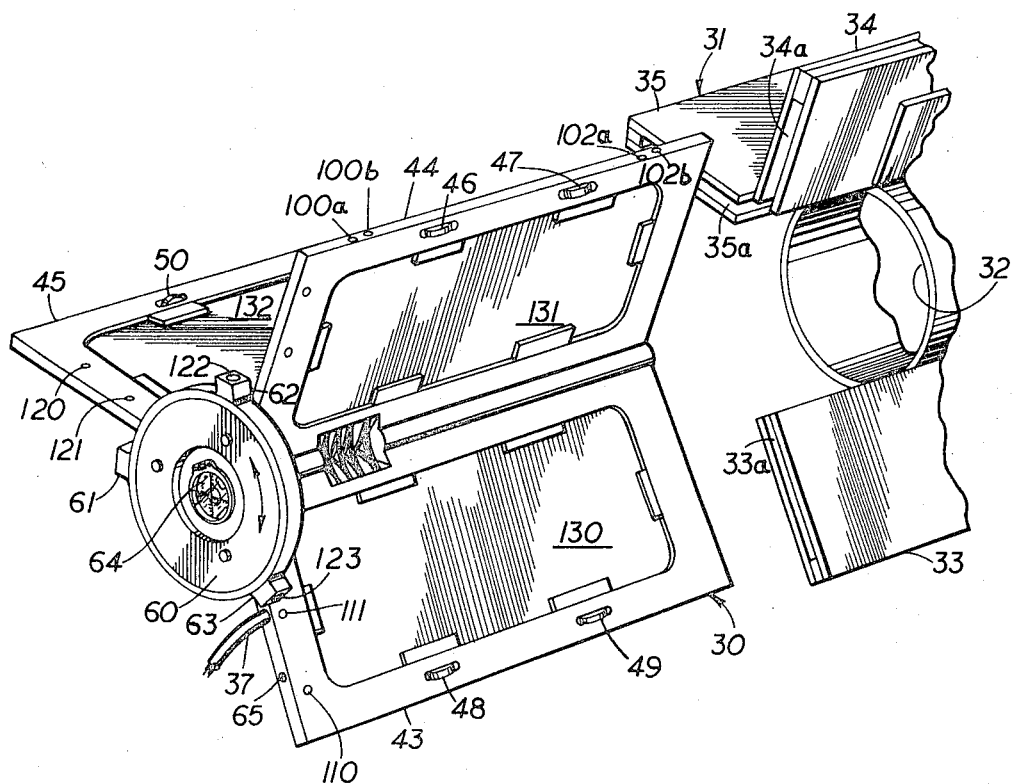
FIG. 4 shows an isometric view of a transducer carrier according to an embodiment of the present invention and positioned for insertion into a work piece.
Figure 5:
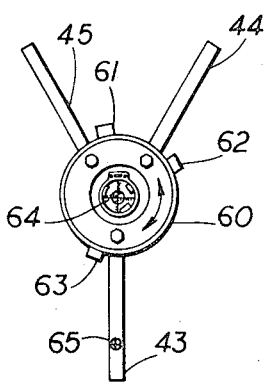
FIG. 5 shows an elevation view of the rotor end of the transducer carrier depicted in FIG. 4.
Figure 6:
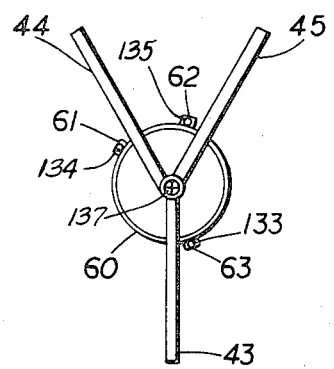
FIG. 6 shows an elevation view of the opposite end of the transducer depicted in FIG. 4.

Turning next to FIGS. 4, 5, and 6, there is shown an exemplary complex work piece indicated generally at 31 and having a cylindrical bore 32 and three branches 33, 34, and 35 extending radially outwardly from the cylindrical portion. Each of the three branches contains a corresponding interior channel 33a, 34a, and 35a in communication with the bore 32. It is assumed for illustrative purposes that it is necessary to measure such parameters as the radius of the bore 32 with respect to an imaginary centerline datum extending through the bore; the concentricity of the bore as determined by making measurements at various locations along the interior periphery of the bore; and the width, depth, and angular alignment of the several channels 33a, 34a, and 35a.

Such measurement is accomplished according to the present invention with a transducer carrier indicated generally at 30 and having a number of wings 43, 44, and 45 corresponding in number and in angular alignment to the aforementioned channels 33a, 34a and 35a. The thickness of each of the wings is selected to be slightly less than the width of the corresponding channel, so that the transducer carrier can be slideably passed through the interior of the work piece 31 including the several channels and the cylindrical bore 32. A plurality of rollers 46, 47, 48, 49, and 50, or other suitable guide devices, are provided to assist the passage of the transducer carrier 30 along the interior of the work piece 31.

Disposed at one end of the transducer carrier 30 is a rotor member 60 which is mounted for rotation with respect to the central axis of the transducer carrier and which may be remotely driven for rotation by a synchro (not shown) contained on the transducer carrier. The rotor 60, which has a diameter less than the nominal diameter of the cylindrical bore 32, includes a number of projecting members 61, 62, and 63 extending radially outwardly with the combined radius of the rotor 60 and the outward-extending dimension of each projecting member being selected to be slightly less than the radius of the cylindrical bore 32, so that the entire transducer carrier including the rotor 60 and the projecting members thereon may be slideably inserted into the cylindrical bore 32 of the work piece.

Disposed within the center of the rotor 60 is an optical sighting device 64, which may comprise a pair of transverse cross hairs containing distance graduations. Another optical sighting device 65 is located on one of the wings, for example, on the wing 43, and is situated thereon a fixed known radial distance from the center point of the cross hairs on the sighting device 64. The intersection of the cross hairs of the sighting device 64 is positioned on the central axis of the carrier 30, which also corresponds to a datum line in the disclosed embodiment of the present invention. Another optical sighting device 137 (FIG. 6) is positioned on the carrier axis at the opposite end thereof.

Disposed within the various structural portions of the transducer carrier 30 are a number of electromagnetic proximity transducers of the type shown at 11 on FIG. 1. Although certain of these transducers are designated numerically below, it should be understood that the number and the placement of transducers disclosed herein as being on the transducer carrier 30 is exemplary and is a function of the particular work piece being measured in the disclosed embodiment. It will also be apparent to those skilled in the art, of course, that the configuration of the transducer carrier 30 is designed to be a complementary fit to the work piece, or at least is designed to have structural portions carrying transducers at locations adjacent the work piece surface or surfaces to be measured.

The transducer carrier 30 of the present embodiment includes a pair of transducers 100a and 100b disposed on the outer end of the wing 44 at staggered locations with respect to the half-width or longitudinal centerline of that wing. Transducers 102a and 102b are similarly positioned in staggered relation adjacent the opposite end of the wing 44. Additional transducers are positioned at 110 and 111, along a side of the wing 43, and at 120 and 121, along a side of the wing 45. A transducer is also disposed on the outer surface of each of the rotor projecting members 61, 62, and 63, with two of these transducers visible at 122 and 123. Still additional transducers 133 134, and 135 (see FIG. 6) may be disposed on the sides of the respective projecting members which face the opposite end of the carrier 30.

Each of the transducers borne by the carrier 30 receives an input signal from an oscillator 13, as described above, and provides an output signal which is a function of the distance from the particular transducer to a work piece surface adjacent the transducer. The power and signals of the various transducers, as well as the operating power for the synchro associated with the rotor 60, are supplied to the carrier through a control cable 37. Since a particular transducer carrier such as shown at 30 may have seventy or more transducers associated therewith, the use of the multiplexer 15 as shown in FIG. 1 becomes virtually mandatory to minimize the size of the control cable 37. The multiplexer 15, which in actual practice may be a plurality of multiple-input multiplexers connected in decade to provide the desired multiplexing capacity, as well as the oscillator 13, the synchronous detector 16, and the analog-digital converter 20 may advantageously be disposed on the panels 130, 131, and 132 contained within the wings of the transducer carrier since the current level of solid-stage technology permits the aforementioned circuit components to be contained in physically small packages.

It will be apparent that insertion of the transducer carrier within the work piece 31 places the various transducers of the carrier into close proximity with various of the work piece surfaces. The transducers 110, 111 and 120, 121, for example, provide output signals which indicate the measured distance from the respective transducers to the confronting walls of channels 33a and 35a, respectively. The transducers 100a, 100b and 102a, 102b provide output signals indicating the distance between those transducers and the outward end of the channel 34a. Moreover, the aforementioned staggered relationship of the transducers 100a, 100b and of the transducers 102a, 102b with respect to the half-width or the longitudinal centerline of the wing 44 provides two sets of measured distance data at differing locations along the width of the channel 34a end wall, thus to determine whether the aforementioned end wall is exactly perpendicular or has some other angular relation with respect to the side walls of that channel.

The transducers 122 and 123 provide signals corresponding to the measured distances between those transducers and the interior circumference of the bore 32. Moreover, rotating the rotor 60 by means of the synchro provides output signals indicative of the measured distance from the aforementioned transducers to the wall of the bore along a complete circumferential scan of the bore for a particular location of the transducer carrier 30. It will be understood, of course, that only a single projecting member 62, for example, and a corresponding transducer 122 need be provided for this purpose, although the depicted provision of three abutment members and corresponding transducers carried thereon permits complete circumferential measurement of the bore with only 60° rotation of the rotor 60.

The transducers, 133, 134, and 135 provided on the inward-facing sides of the abutment members 61, 62, 63 permit measurement of a land or counterbore surface (not shown) which may be contained within the bore 32.

Once the transducer carrier has been provided with transducers which are suitably positioned thereon with regard to the work piece to be measured, it is necessary to calibrate the transducers and also to calibrate the carrier-transducer combination. Calibration of each individual transducer is accomplished by placing a test surface a number of known distances from that transducer as measured, for example, with a micrometer, and by measuring the electrical output of that transducer for each known test surface position. The foregoing calibration yields data which produces a curve similar to that shown in FIG. 7, corrected of course as shown at 25 thereon to remove ambiguity within the desired range of air gaps. The voltage/air gap calibration is thus determined for each of the transducers on the carrier 30, and the calibration information thus obtained advantageously is stored in the computer 21, which may be a general purpose digital computer programmed in a manner known to those skilled in the art to store the aforementioned discrete calibration data and also programmed to provide interpolations between the discrete calibration points such that a subsequently-measured transducer voltage which lies between the voltages previously calibrated for two discrete calibration points is interpolated by the computer to produce an output signal corresponding to an interpolated distance between the aforementioned two discrete calibrations.

Once the calibration data for each of the transducers on the carrier has been obtained and stored in the memory of the computer 21, the overall calibration characteristics of each of the transducers as disposed on the carrier 30 must be obtained. This overall calibration data may be advantageously obtained by providing a test fixture which is a replica of at least a portion of the work piece 31 and which has known standard dimensions. The carrier is inserted within the test fixture so that the various transducers on the carrier are disposed in measurement proximity with corresponding surfaces of the test fixture. Although the output signals of the various transducers could at this time be compared with the respective calibration data for each of the transducers, as stored in the computer, to determine the measured distances between the various transducers and corresponding surfaces of the test fixture, this measured data is relatively meaningless without a determination of the exact position of the carrier in the test fixture relative to some known fixed datum. This position information is obtained by sighting with known optical alignment measuring techniques onto the sighting device 64 contained within the rotor 60 and also onto the sighting device 137 (FIG. 6) similarly contained along the carrier centerline at the opposite end thereof. If it is assumed, for example, that an imaginary line which passes along the exact desired centerline of an ideal bore 32 and similarly along the centerline of a corresponding bore in the test fixture is a reference datum, then the amount of any deviation in the position of the carrier 30 therefrom is determined by optical alignment techniques and may be input to the computer 21 by any suitable technique such as the keyboard 23. It will be appreciated that if the carrier 30 is not precisely aligned along the aforementioned datum, that is, if either or both of the ends of the carrier are displaced along the X and/or Y-axes with respect to this centerline, this resulting skew of the carrier with regard to the chosen centerline datum causes variations in the measured-distance signals produced by the sensors; these variations must be corrected to reference the measurements produced by the sensors with regard to the predetermined centerline datum.

Considering the correction of the measured signal S, for example, from one of the channel depth sensors such as 100a and assuming that this sensor is located on the wing 44 a fixed radial distance K from the chosen datum (in the disclosed embodiment, the longitudinal centerline of the carrier 30) correction for translational or X, Y displacement from the datum is computed by the following formula $$D = \sqrt{[(K + S) \cos \theta + X]^2 + [(K + S) \sin \theta + Y]^2}$$

where the angle $\theta$ represents the angular position of the selected wing 44 with respect to a predetermined reference angle taken along the datum line and where D is the true radial distance from the datum to the end wall of the channel.

Figure 8:
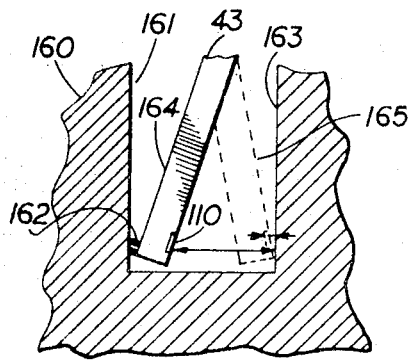
FIG. 8 shows a partial section view of calibration apparatus according to an embodiment of the present invention.

An exemplary portion of a calibration test fixture is shown at 160 in FIG. 8 and includes a channel portion 161 having a nominal depth substantially equal to the depth of a corresponding channel 33a for example of the actual work piece. A stop member 162 is affixed to one wall of the test fixture channel 161. In describing the operation of the test fixture 160 it is assumed that the transducer carrier 30 has been inserted into the overall test fixture, which generally resembles the work piece 31 of FIG. 4, and that a particular wing 43 extends downwardly into the test fixture channel 160. This wing 43 includes at least one exemplary transducer 110 mounted on a side thereof to measure the distance from one of the side walls of the channel to an imaginary datum plane which may be chosen to be a radial plane extending from the carrier centerline along the mid-point between the nominal dimensions of the channel walls. The individual transducer 110 will have been previously calibrated as discussed above to produce calibration information which may be graphically represented as in FIG. 7 and which in practice preferably is stored in a computer suitably programmed to yield distance output information in response to a transducer signal subsequently applied to the computer. While these calibration curves and the computer-generated information corresponding thereto generally remain fixed over an extended period of time, the constant values which correlate the curve to particular locations on the voltage/air gap axes are subject to change from time to time depending upon factors such as the temperature of the transducer. It will be apparent from the graphic analogy of FIG. 7 that any two points thereon fix the location of the relatively invariant curve, and so one such point is obtained according to the apparatus shown in FIG. 8 through a first step of manipulating the transducer carrier so that the wing 43 contacts the stop member 162 in the position shown at 164. The transducer 110 thus is disposed a precisely known distance from the channel wall 163, and the transducer output signal corresponding to this known distance is supplied as aforementioned to the computer. The carrier next is manipulated to place the wing 43 in a second position 165, as shown in phantom in FIG. 8, so that the transducer 110 assumes a second precisely known position with respect to the channel wall 163. The transducer output signal corresponding to this second known distance also is input to the computer, and these two signals are operated on by the computer to adjust the constants in the transducer signal-measured position equation as necessary to cause this equation to be adjusted to yield the known distances associated with the aforementioned two positions of the wing 43 and the transducer 110 carried thereby. Referring again to the graphic analogy of FIG. 7, the response curve of the transducer remains unchanged but has in effect been repositioned relative to the axes to compensate for thermal drift or other factors affecting the output of the transducer. It will be apparent from the foregoing discussion of required correction for the positioning of the transducer carrier 30 with respect to the predetermined datum, that the foregoing two-position calibration utilizing the test fixture 160 includes necessary corrections for translational and/or rotational deviation of the carrier 30 from a predetermined datum.

Once the calibration of the transducers and of the transducer carrier has been accomplished as aforementioned the apparatus is ready to be used in the measurement of a work piece 31. The transducer carrier 30 is inserted within the work piece and is positioned therealong with the assistance of the rollers 46–50. The operator of the apparatus can position the transducer carrier at one or more positions or measuring stations as required by the manufacturing or checking requirements for the work piece, and at each such measuring station the outputs of all of the various transducers on the carrier can be measured in sequence by selection in the multiplexer 15. It will be apparent to those skilled in the art that the computer 21 can be programmed to perform any desired sequence of transducer selection, to compare the output signal of each selected transducer with the previously-stored and corrected calibration data for that transducer, to adjust the transducer measured data for any observed deviation of the carrier position with respect to the datum (such deviation data being input to the computer, for example, through the keyboard 23), and then to compute a corrected actual distance from the datum to a work piece location adjacent that particular transducer. This computed actual distance can be printed on the printer 22 or otherwise utilized.

Similarly, the transducers contained on the projecting members 61–63 of the rotor member 60 can provide output information concerning various locations on the interior of the bore 32 and also can provide information on a complete circumference of that bore by appropriate rotation of the rotor 60. Similar correction factors are applied as aforementioned, and the data developed from the rotor-mounted sensors 122, 123 for example can be used to determine the concentricity of the bore 32.

Although the carrier 30 is a relatively close slideable fit within the work piece 32 it will be apparent that some rotational movement of the carrier is inevitably possible because of the clearance requirements necessary for the aforementioned sliding fit. Optical sighting on the sighting device 65, which is offset a predetermined distance from the datum centerline defined by the cross hairs of the sighting device 64, provides a convenient technique for evaluating the extent of such unwanted rotation of the carrier 30. Since the radial distance from the datum centerline to a particular transducer 110, for example, and also the radial distance to the sighting device 65, are known, any optically measured offset of the sighting device 65 from a datum location can be used to compute the corrected measured distance from the output signal of the transducer 110 by a simple ratio of the aforementioned radial distances.

Since the measurement of a particular work piece 31 at several measuring stations therealong, using a transducer carrier 30 containing a number of separate transducers, may require an amount of time sufficient to present at least the possibility that heating or other factors may have caused one or more of the transducers on the carrier to have drifted from the calibration correction previously obtained with respect to the test fixture 160, it may be desirable to return the carrier 30 to the test fixture once the measurement of the work piece 31 has been completed. The calibration correction routine for each of the transducers can then be repeated to determine whether the calibration of the transducers has not deviated in excess of acceptable limits from the previously-determined transducer calibration.

It should be understood, of course, that the foregoing relates only to a preferred embodiment of the invention and that numerous modifications or alterations may be made therein without departing from the spirit and the scope of the invention as set forth in the appended claims.

What is claimed is:

1. Apparatus for measuring linear distance between a workpiece surface and a predetermined datum positioned in spaced relation to the workpiece, comprising:
   transducer carrier means having a reference point and configured for proximate disposition adjacent a surface to be measured;
   at least one distance transducer means disposed to be carried by said carrier means in predetermined relation to said reference point and operative to produce an output signal which varies in response to the distance between said transducer means and the surface locations adjacent said transducer carrier means;
   locating means operatively associated with said carrier means to provide a position correction signal corresponding to deviation of the position of said carrier means reference point relative to said predetermined datum in spaced relation to the workpiece; and
   location correction means operative in response to said output signal and said position correction signal to produce a signal which corresponds to the distance between said surface location and said predetermined datum in spaced relation to the workpiece.

2. Apparatus as in claim 1, wherein:
   said carrier means is configured to be movable along an interior passageway which is defined at least in part by the surface of the workpiece to be measured; and
   said locating means comprising means utilizing optical alignment techniques and using at least one optical target means disposed at said reference point on said carrier means in position to be visible from without said passageway.

3. Measuring apparatus comprising:
   transducer carrier means having a reference location and operative to be disposed in measurement relation with a workpiece;
   at least one transducer means disposed on said carrier means in a predetermined location relative to said reference location to be in measurement relation with a surface of the workpiece;
   said transducer means being operative to produce a signal which is a function of the separation between a workpiece location proximate said transducer means and said predetermined location on said carrier means;
   transducer carrier position response means operatively associated with said reference location on said carrier means to produce an output signal which is a function of the spatial location of said carrier means reference location with respect to a predetermined datum located independently of said workpiece, and
   signal processing means receiving said signal from said transducer means and said output signal from said carrier position responsive means and operative to generate a signal which is a function of the distance between the workpiece location and said predetermined datum.

4. Measuring apparatus for obtaining dimensional measurement of a workpiece with respect to a predetermined datum, positioned in spaced relation to the workpiece, comprising:
   transducer carrier means having a shape which is complementary of at least a portion of the workpiece and having an axis;
   at least one distance transducer means disposed on a complementary shape portion of said transducer carrier means in predetermined relation to said axis to be in distance measurement relation with a location on the workpiece;

first reference means positioned on said transducer carrier means at a first predetermined location thereon relative to said axis and operative to impart information of the extent of translational departure of said axis from the predetermined datum; and at least one additional reference means positioned on said transducer carrier means at a second predetermined location thereon displaced a predetermined distance from said first predetermined location to impart information on the extent of angular departure of said carrier axis from the predetermined datum.

5. Apparatus as in claim 4, for use in measurement of a workpiece having a bore extending therein;

said transducer carrier means including a central portion on which said first reference means is disposed;

said transducer carrier means including rotatable means mounted for selective rotation about said axis with respect to said central portion, said rotatable means being dimensioned to be received within the bore for rotation therein; and said at least one distance transducer means being disposed on said rotatable means in radially spaced relation to said axis to be positioned in measurement relation with the circumferential wall of the bore when said rotatable means is received therein.

6. Apparatus as in claim 5, wherein said first reference means comprises an optical sighting device positioned on said axis to be visible from without the bore of the workpiece.

7. Apparatus as in claim 4, wherein said first reference means is positioned on said axis, and said additional reference means is positioned a predetermined radial distance from said axis.

8. Apparatus as in claim 7, wherein said first reference means comprises a first optical sighting device positioned at a first location on said axis; and said additional reference means comprises an additional optical sighting device positioned on said transducer carrier means in radially spaced relation to said axis.

9. Apparatus as in claim 8, further comprising:

second optical sighting device positioned on said axis at a second location axially spaced from said first location.

10. Apparatus as in claim 4 for use in measurement of a workpiece having an opening extending into a hollow interior region defined by wall members, and wherein the location of such wall members relative to said predetermined datum extending in said interior region is to be measured, further comprising:

said transducer carrier means includes a central portion including said axis and dimensioned to be received within such hollow interior;

at least one transducer support means extending from said central portion and having an external shape complementary of the wall member location to be measured;

said at least one distance transducer means positioned on said transducer support means to be positioned in said distance measurement realtion with the wall member location when said transducer support means is in said complementary position therewith;

said first reference means comprising an optical sighting device positioned on said central portion to be visible from without such hollow interior; and said additional reference means comprising an additional optical sighting device positioned in radially spaced relation to said axis to be visible from without such hollow interior.

11. Apparatus as in claim 10, wherein:

said transducer support means has an outer end surface of certain width positioned in spaced apart measurement relation with said wall member location;

said at least one distance transducer means comprises first distance transducer means disposed on said outer end surface at a first location thereon relative to the width thereof; and second distance transducer means disposed on said outer end surface at a second position thereon relative to the width thereof;

said second width position being dissimilar to said first width position.

* * * * *